M. F. COOLBAUGH.
PROCESS FOR TREATING ORES AND CONCENTRATES.
APPLICATION FILED FEB. 23, 1918.
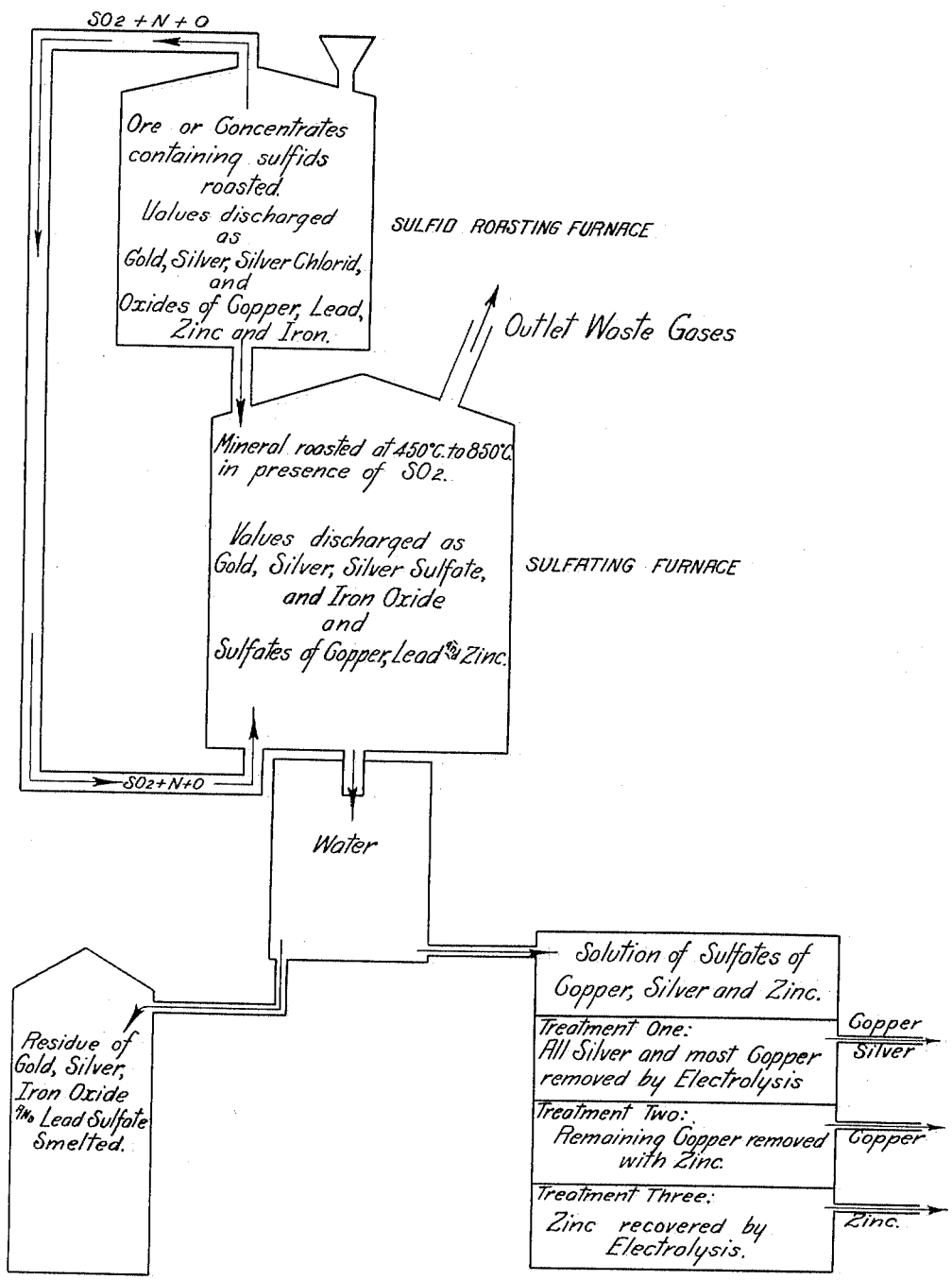

UNITED STATES PATENT OFFICE.

MELVILLE F. COOLBAUGH, OF GOLDEN, COLORADO, ASSIGNOR OF ONE-HALF TO J. BURNS READ, OF VERMILION, SOUTH DAKOTA.

PROCESS FOR TREATING ORES AND CONCENTRATES.

1,315,761.     Specification of Letters Patent.     Patented Sept. 9, 1919.

Application filed February 23, 1918. Serial No. 218,659.

*To all whom it may concern:*

Be it known that I, MELVILLE F. COOLBAUGH, a citizen of the United States, residing at Golden, county of Jefferson, and State of Colorado, have invented certain new and useful Improvements in Processes for Treating Ores and Concentrates; and I do declare the following to be a full, clear, and exact description of the invention, such as will enable others skilled in the art to which it appertains to make and use the same, reference being had to the accompanying drawings, which form a part of this specification.

This invention relates particularly to the conversion to sulfates of ores and concentrates of zinc and lead which nearly always carry iron and often copper and some gold and silver.

Lead and zinc often occur together and in many cases cannot be efficiently separated by mechanical means. Under present processes any lead going to the zinc retorts makes the recovery of the zinc more difficult, and any zinc going to the lead furnace makes the recovery of the lead more difficult. Commercially, in each of these cases the ore of one metal is penalized for containing appreciable amounts of the other.

These difficulties are overcome by my process, the various steps of which are diagrammatically set forth in the accompanying drawings.

The ore or concentrate containing sulfid minerals is first roasted in a roasting furnace of any type, wherein the ore is moved gradually through the furnace. During the roasting the sulfur of the various sulfids is converted into sulfur dioxid as is well known, which results in the generation of much heat. If the sulfur content is high, sufficient heat will be generated to maintain the roasting, but if the sulfur content is too low, heat must be supplied as by burning gas, oil, or powdered coal.

By this treatment the zinc, copper, lead and iron compounds are changed to oxids, the gold is changed to or remains as metal, depending upon its condition originally, and the silver is changed to metal or remains as chlorid depending upon its original condition.

After the above treatment, the roasted minerals are discharged into another furnace where they are brought in contact with the hot gaseous products from the first furnace which consists of sulfur dioxid, nitrogen and oxygen.

The temperature of this second furnace is maintained between 450° C. and 850° C. Under these conditions the oxids of zinc, copper and lead, and the silver chlorid are changed into sulfates, the iron oxid and the metallic gold and silver being unaffected The proper temperature in this furnace depends upon the composition of the ore or concentrate, and the hot gases introduced may contain from 3% to 10% of sulfur dioxid by volume.

The resulting product is now discharged and treated with water, the sulfates of zinc, copper and silver being dissolved. The solution containing the sulfates is drawn off and electrolyzed, removing all of the silver and most of the copper. The remaining copper may be removed by adding a small quantity of zinc, or by passing the solution through zinc shavings. The purified zinc solution is electrolyzed by modern methods to recover the zinc.

The insoluble residue containing the lead sulfate, iron oxid and metallic gold and silver, can be smelted by any lead smelting method to recover the values therein.

While it is possible to convert the ore or concentrate directly into sulfates in the first furnace, the same is not accomplished with any marked degree of efficiency, since the temperature and the concentration of the gases in contact with the minerals cannot be properly controlled. But once the materials have been converted to oxids, conversion into sulfates becomes easy.

Naturally occurring oxids, carbonates, and like compounds may be treated in a similar manner, with the difference that no previous roast is required, and the sulfur dioxid gas must be furnished from an independent source.

Having thus described my invention, what I claim is:

1. The process of treating sulfid minerals and concentrates comprising roasting the ores to convert the sulfids into oxids and subsequently treating the oxids between 450° C. and 850° C. in the presence of sulfurous gases to convert said oxids into sulfates.

2. The process of treating sulfid ores and concentrates comprising roasting the minerals in the presence of oxygen to liberate the sulfur, heating the converted minerals and introducing the sulfurous gases from the roasting into contact with the minerals during the heating, and maintaining the temperature between 450° C. and 850° C. to convert the convertible compounds into sulfates, the sulfur dioxid content of the sulfurous gases introduced being maintained in excess of 3%.

3. The process of treating sulfid ores and concentrates comprising roasting the minerals in the presence of oxygen, and subsequently heating the oxidized minerals between 450° C. and 850° C. in the presence of sulfurous gases, to convert the convertible compounds into sulfates.

4. The process of treating sulfid ores and concentrates comprising roasting the minerals in the presence of oxygen, and subsequently heating the oxidized minerals between 450° C. and 850° C. in the presence of sulfurous gases of sulfur dioxid content in excess of 3%, to convert the convertible compounds into sulfates, and separating the soluble sulfates from the insoluble materials by treatment with water.

5. The process of treating oxids, carbonates and like compounds which comprises heating the same between 450° C. and 850° C. in the presence of sulfurous gases to convert the convertible compounds into sulfates.

6. The process of treating oxids, carbonates and like compounds of lead and zinc, which comprises heating the same between 450° C. and 850° C. in the presence of sulfurous gases of sulfur dioxid content in excess of 3% to convert into sulfates and dissolving the zinc sulfate from the lead sulfate.

7. The process of treating sulfid ores and concentrates comprising roasting the minerals in the presence of oxygen to liberate the sulfur and subsequently treating the converted minerals between 450° C. and 850° C. in the presence of sulfurous gases of sulfur dioxid content of 3% or over to convert the convertible compounds into sulfates.

In testimony whereof I affix my signature.

MELVILLE F. COOLBAUGH.